(12) United States Patent
Reunamäki et al.

(10) Patent No.: US 7,643,811 B2
(45) Date of Patent: Jan. 5, 2010

(54) METHOD AND SYSTEM FOR INTERFERENCE DETECTION

(75) Inventors: Jukka Reunamäki, Tampere (FI); Arto Palin, Viiala (FI)

(73) Assignee: Nokia Corporation, Espoo (FI)

(*) Notice: Subject to any disclaimer, the term of this patent is extended or adjusted under 35 U.S.C. 154(b) by 923 days.

(21) Appl. No.: 10/853,212

(22) Filed: May 26, 2004

(65) Prior Publication Data

US 2005/0266808 A1    Dec. 1, 2005

(51) Int. Cl.
*H04B 17/00* (2006.01)
(52) U.S. Cl. .................. 455/226.2; 455/296; 455/132; 455/552.1; 455/63.1; 455/226.4; 455/67.13
(58) Field of Classification Search ......... 455/130–141, 455/63.1–65, 550.1–553.1, 226.1–226.4, 455/295–312, 67.11–67.7
See application file for complete search history.

(56) References Cited

U.S. PATENT DOCUMENTS

| | | | | |
|---|---|---|---|---|
| 3,670,275 A * | 6/1972 | Kalliomaki et al. | ......... | 455/132 |
| 4,181,892 A * | 1/1980 | Dilley | ......... | 455/306 |
| 4,710,975 A * | 12/1987 | Okamoto et al. | ......... | 455/276.1 |
| 5,046,133 A * | 9/1991 | Watanabe et al. | ......... | 455/138 |
| 5,056,153 A * | 10/1991 | Taniguchi et al. | ......... | 455/556.1 |
| 5,504,776 A * | 4/1996 | Yamaura et al. | ......... | 375/141 |
| 5,539,781 A * | 7/1996 | Matsuura | ......... | 375/347 |
| 5,640,694 A * | 6/1997 | Milton, Jr. | ......... | 455/133 |
| 5,710,995 A * | 1/1998 | Akaiwa et al. | ......... | 455/277.2 |
| 5,874,916 A * | 2/1999 | Desjardins | ......... | 342/378 |
| 5,918,164 A * | 6/1999 | Takahashi et al. | ......... | 455/134 |
| 5,974,101 A * | 10/1999 | Nago | ......... | 375/350 |
| 6,072,994 A * | 6/2000 | Phillips et al. | ......... | 455/84 |
| 6,115,409 A * | 9/2000 | Upadhyay et al. | ......... | 375/144 |
| 6,278,723 B1 | 8/2001 | Meihofer et al. | | |
| 6,327,300 B1 | 12/2001 | Souissi et al. | | |
| 6,327,312 B1 * | 12/2001 | Jovanovich et al. | ......... | 375/316 |
| 6,377,608 B1 | 4/2002 | Zyren | | |
| 6,509,934 B1 * | 1/2003 | Bao et al. | ......... | 348/570 |
| 6,577,670 B1 * | 6/2003 | Roberts | ......... | 375/133 |
| 6,615,040 B1 | 9/2003 | Benveniste | | |
| 6,639,541 B1 * | 10/2003 | Quintana et al. | ......... | 342/18 |
| 6,711,380 B1 | 3/2004 | Callaway, Jr. | | |
| 6,718,166 B2 * | 4/2004 | Cordone et al. | ......... | 455/306 |
| 6,882,851 B2 | 4/2005 | Sugar et al. | | |
| 6,892,054 B2 * | 5/2005 | Belcher et al. | ......... | 455/63.1 |
| 6,968,197 B2 * | 11/2005 | Mori et al. | ......... | 455/502 |

(Continued)

FOREIGN PATENT DOCUMENTS

EP    1 085 785 A2    3/2001

(Continued)

*Primary Examiner*—Lana N Le
*Assistant Examiner*—RuiMeng Hu
(74) *Attorney, Agent, or Firm*—Locke Lord Bissell & Liddell

(57) ABSTRACT

A wireless communications device includes a first receiver and a second receiver. The first receiver is configured to receive a first wireless signal (such as a Bluetooth or WLAN signal), while the second receiver is configured to receive a second wireless signal (such as a UWB signal). In addition, the second receiver is configured to determine spectral characteristics of the first wireless signal. Based on these determined spectral characteristics, an interference detection module may identify interference in the first wireless signal.

37 Claims, 11 Drawing Sheets

U.S. PATENT DOCUMENTS

| | | | |
|---|---|---|---|
| 7,079,812 | B2 | 7/2006 | Miller et al. |
| 7,089,033 | B2 * | 8/2006 | Leinonen et al. ......... 455/553.1 |
| 7,120,437 | B2 * | 10/2006 | Benson et al. .............. 455/434 |
| 7,133,646 | B1 * | 11/2006 | Miao .......................... 455/73 |
| 7,133,686 | B2 * | 11/2006 | Hundal et al. ............... 455/465 |
| 7,146,133 | B2 | 12/2006 | Bahl et al. |
| 7,158,769 | B2 * | 1/2007 | Okanoue et al. ......... 455/226.1 |
| 7,181,166 | B2 * | 2/2007 | Shimada et al. ............... 455/62 |
| 7,212,832 | B2 * | 5/2007 | Yokota ....................... 455/513 |
| 7,263,355 | B2 * | 8/2007 | Morikawa et al. ........... 455/424 |
| 7,292,830 | B1 * | 11/2007 | Cheung et al. .............. 455/136 |
| 7,313,413 | B2 * | 12/2007 | Han ........................ 455/553.1 |
| 7,317,698 | B2 * | 1/2008 | Jagger et al. ................ 370/328 |
| 7,317,751 | B2 * | 1/2008 | Kyösti ........................ 375/148 |
| 7,372,926 | B2 * | 5/2008 | Kanemoto et al. .......... 375/347 |
| 7,444,166 | B2 * | 10/2008 | Sahota .................... 455/553.1 |
| 7,480,490 | B2 * | 1/2009 | Haartsen ...................... 455/73 |
| 2002/0006174 | A1 * | 1/2002 | Nafie et al. ................. 375/346 |
| 2002/0021746 | A1 | 2/2002 | Schmidl et al. |
| 2002/0142744 | A1 * | 10/2002 | Okanoue et al. ......... 455/226.1 |
| 2002/0173341 | A1 * | 11/2002 | Abdelmonem et al. ...... 455/561 |
| 2002/0176385 | A1 | 11/2002 | Huh et al. |
| 2002/0177414 | A1 * | 11/2002 | Shimada et al. ............. 455/67.1 |
| 2003/0058923 | A1 | 3/2003 | Chen et al. |
| 2003/0124999 | A1 * | 7/2003 | Parssinen et al. ......... 455/226.1 |
| 2003/0153291 | A1 * | 8/2003 | Tsushima ................. 455/200.1 |
| 2003/0216122 | A1 * | 11/2003 | Cordone et al. ............. 455/63.1 |
| 2003/0224751 | A1 * | 12/2003 | Vanderhelm et al. ........ 455/296 |
| 2004/0043733 | A1 * | 3/2004 | Marrah et al. .............. 455/138 |
| 2004/0048574 | A1 * | 3/2004 | Walker et al. .............. 455/63.1 |
| 2004/0132410 | A1 * | 7/2004 | Hundal et al. ............. 455/67.13 |
| 2004/0142669 | A1 * | 7/2004 | Vogt et al. .................. 455/136 |
| 2004/0171351 | A1 * | 9/2004 | Nakazawa et al. ....... 455/67.13 |
| 2004/0203399 | A1 * | 10/2004 | Allen ........................ 455/63.1 |
| 2004/0204031 | A1 * | 10/2004 | Kardach et al. .......... 455/552.1 |
| 2004/0219885 | A1 * | 11/2004 | Sugar et al. .............. 455/67.11 |
| 2004/0224719 | A1 * | 11/2004 | Nounin et al. ........... 455/553.1 |
| 2005/0020297 | A1 * | 1/2005 | Axness et al. ............ 455/552.1 |
| 2005/0159109 | A1 | 7/2005 | Kivekäs et al. |
| 2005/0181752 | A1 * | 8/2005 | Sahota ....................... 455/132 |
| 2005/0181823 | A1 * | 8/2005 | Haartsen ................. 455/553.1 |
| 2005/0239497 | A1 * | 10/2005 | Bahl et al. ............... 455/552.1 |
| 2005/0255815 | A1 * | 11/2005 | Hammerschmidt et al. . 455/132 |
| 2005/0255878 | A1 * | 11/2005 | Leinonen et al. ......... 455/552.1 |
| 2006/0009177 | A1 * | 1/2006 | Persico et al. ............... 455/143 |
| 2008/0160916 | A1 * | 7/2008 | Jagger et al. ............... 455/63.1 |

FOREIGN PATENT DOCUMENTS

| | | |
|---|---|---|
| EP | 1 119 112 A2 | 7/2001 |
| EP | 1 119 137 A1 | 7/2001 |
| EP | 1 148 677 A2 | 10/2001 |
| EP | 1 176 731 A1 | 1/2002 |
| EP | 1 187 504 A2 | 3/2002 |
| EP | 1 199 842 A2 | 4/2002 |
| EP | 1 207 654 A2 | 5/2002 |
| EP | 1 220 499 A2 | 7/2002 |
| EP | 1 225 709 A1 | 7/2002 |
| EP | 1 229 693 A2 | 8/2002 |
| EP | 1 389 855 A2 | 2/2004 |
| WO | WO 99/49593 | 9/1999 |
| WO | WO 00/04658 | 1/2000 |
| WO | WO 00/04659 | 1/2000 |
| WO | WO 00/46929 A1 | 8/2000 |
| WO | WO 01/24454 A1 | 4/2001 |
| WO | WO 01/24455 A1 | 4/2001 |
| WO | WO 01/24457 A1 | 4/2001 |
| WO | WO 01/24458 A1 | 4/2001 |
| WO | WO 01/35540 A2 | 5/2001 |
| WO | WO 01/35578 A1 | 5/2001 |
| WO | WO 01/63797 A1 | 8/2001 |
| WO | WO 01/84789 A2 | 11/2001 |
| WO | WO 01/89102 A1 | 11/2001 |
| WO | WO 02/03627 A2 | 1/2002 |
| WO | WO 02/19743 A2 | 3/2002 |
| WO | WO 02/060133 A2 | 8/2002 |
| WO | WO 02/060211 A2 | 8/2002 |
| WO | WO 02/067469 A1 | 8/2002 |
| WO | WO 02/069577 A1 | 9/2002 |
| WO | WO 02/087173 A1 | 10/2002 |
| WO | WO 02/100025 A1 | 12/2002 |
| WO | WO 03/019798 A2 | 3/2003 |
| WO | WO 03/061224 A1 | 7/2003 |
| WO | WO 03/071824 | 8/2003 |

* cited by examiner

METHOD AND SYSTEM FOR INTERFERENCE DETECTION

FIELD OF THE INVENTION

The present invention relates to wireless communications. More particularly, the present invention relates to techniques for detecting interference.

BACKGROUND OF THE INVENTION

The Industrial, Scientific, and Medical (ISM) bands between 2400 MHz and 2483.5 MHz is utilized by nearly all Wireless Local Area Networks (WLAN) and Wireless Personal Area Networks (WPAN) systems. Currently, the most significant of these are Bluetooth networks and networks that operate according to the IEEE 802.11 standards (However, IEEE 802.11a operates in the 5 GHz ISM band).

Bluetooth defines a short-range radio network, originally intended as a cable replacement. It can be used to create ad hoc networks of up to eight devices, where one device is referred to as a master device and the other devices are referred to as slave devices. The slave devices can communicate with the master device and with each other via the master device. Bluetooth devices are designed to find other Bluetooth devices within their communications range and to discover what services they offer. Bluetooth networks may utilize 79 channels, each having a 1 MHz bandwidth. To enhance robustness, Bluetooth networks perform frequency hopping among all or some of these 79 channels.

WLANs are local area networks that employ high-frequency radio waves rather than wires to exchange information between devices. IEEE 802.11 refers to a family of WLAN standards developed by the IEEE. In general, WLANs in the IEEE 802.11 family provide for 1 or 2 Mbps transmission in the 2.4 GHz band (except IEEE 802.11a) using either frequency hopping spread spectrum (FHSS) or direct sequence spread spectrum (DSSS) transmission techniques. Within the IEEE 802.11 family are the IEEE 802.11b and IEEE 802.11g standards.

IEEE 802.11b (also referred to as 802.11 High Rate or Wi-Fi) is an extension to IEEE 802.11 and provides for data rates of up to 11 Mbps in the 2.4 GHz band. This provides for wireless functionality that is comparable to Ethernet. IEEE 802.11b employs only DSSS transmission techniques. IEEE 802.11g provides for data rates of up to 54 Mbps in the 2.4 GHz band. For transmitting data at rates above 20 Mbps (or when all devices are IEEE 802.11g capable), IEEE 802.11g employs Orthogonal Frequency Division Multiplexing (OFDM) transmission techniques. However, for transmitting information at rates below 20 Mbps, IEEE 802.11g employs DSSS transmission techniques. The DSSS transmission techniques of IEEE 802.11b and IEEE 802.11g involve signals that are contained within a 22 MHz wide channel. These 22 MHz channels are within the ISM band.

Increasingly, bands such as the ISM band are being consumed by various types of communications devices that utilize the same spectral portions. This is becoming a problem because the spectrum usage of WLAN and WPAN systems are regulated in only a very coarse manner. Therefore, transmissions from such communications devices may interfere with each other. In addition, interfering energy in the ISM bands may be caused by other sources. Examples of such sources include microwave ovens and harmonics of cellular telephony transmissions (e.g., GSM and IS-95 transmissions).

In order for communications networks to operate efficiently, static interference should be detected so that occupied frequencies are avoided. With this increasing number of communications devices and interference sources, it is desirable for communications devices to somehow analyze channel parameters before communications are actually initiated. Such an analysis would indicate the presence of other devices and potential interference sources at certain frequencies. Once indicated, use of these frequencies could be avoided.

In Bluetooth, various proposals exist which relate to adaptive frequency hopping in which the device first analyses the whole frequency band to detect "free" channels and adapts its frequency hopping scheme correspondingly. However, existing and proposed methods such as these are time consuming because a large number of measurements are required to locate bandwidths that exhibit interference.

Moreover, the channel measuring capabilities of current WLAN and WPAN radios are limited because their channel measurements fail to cover the entire band at once. Hence, they are both power and time consuming. This drawback can be attributed in part to the sampling rates employed by the existing systems. These sampling rates are much lower than the total bandwidth in which the device can place a transmission (e.g., the entire ISM band).

For example, Bluetooth employs a sampling rate of approximately 10 mega samples per second (Msps), which is a few times greater than its symbol rate. With this kind of sampling rate, it is not possible to measure at once the entire ISM band in which Bluetooth may operate. Instead, several measurements have to be made. Not only does this technique consume considerable time and power, this technique is also very unreliable because interference could disappear (or suddenly appear) while the Bluetooth device is measuring another part of the band.

Products and devices having the capability to engage in ultra wideband (UWB) communication will exist in the near future. Such devices having both a UWB transceiver and other short-range transceiver (e.g., WLAN, WPAN, and/or Bluetooth) are referred to herein as multi-radio devices.

In connection with the emergence of UWB communications, a high rate physical layer (PHY) standard is currently being selected for IEEE 802.15.3a. There are two PHY proposals remaining in the selection process. One of these candidates is based on a frequency hopping application of orthogonal frequency division multiplexing (OFDM). The other candidate is based on M-ary Binary offset Keying. The OFDM proposal is called Multiband OFDM (MBO).

Neither of these proposals has been able to reach the required percentage of votes for acceptance. Therefore, development of these proposals are occurring simultaneously. In order to develop the OFDM proposal so that it has a larger industrial support, a new alliance called MultiBand OFDM Alliance (MBOA) was formed in June 2003.

The MBOA proposal utilizes OFDM modulation that is capable of handling communications and spectral energy measurements for channels having bandwidths (i.e., greater than 500 MHz) that are greater than many unlicensed frequency bands, such as the ISM band. These measurement capabilities arise from a high sampling rate and OFDM's utilization of fast Fourier transforms (FFTs).

Thus, devices operating according to the MBOA proposal may use their base band to measure frequency bands (such as the ISM band) because they are much narrower than 500

MHz. Accordingly, techniques are needed to employ such capabilities for the detection of interference.

SUMMARY OF THE INVENTION

The present invention provides a wireless communications device that includes a first receiver and a second receiver. The first receiver is configured to receive a first wireless signal (such as a Bluetooth or WLAN signal), while the second receiver is configured to receive a second wireless signal (such as a UWB signal). In addition, the second receiver is configured to determine spectral characteristics of the first wireless signal. Based on these determined spectral characteristics, an interference detection module may identify interference in the first wireless signal.

In addition, the wireless communications device may include a controller that directs the second receiver to determine the spectral characteristics of the first wireless signal. For example, the controller may pass one or more baseband signals from the first receiver to the second receiver. These baseband signals are derived from the first wireless signal. Accordingly, they may include an in-phase (I) signal and a quadrature (Q) signal.

The second receiver may include a fast Fourier transform (FFT) module. This FFT module may be configured to demodulate the second wireless signal as well as determine the spectral characteristics of the first wireless signal. Accordingly, the second wireless signal may be an OFDM modulated UWB signal.

The present invention also provides a method. This method receives a first wireless signal at a first receiver; generates a spectral energy measurement of the first wireless signal at a second receiver; and based on the spectral energy measurement, detects interference in the first wireless signal.

According to a further aspect of the present invention, a wireless communications device includes first and second receivers. These receivers to operate in collaboration for the detection of interference that may occur in a wireless communications bandwidth associated with the first receiver. The receivers maybe configured to receive various types of wireless signals. As an example, the first receiver may receive Bluetooth and/or WLAN signals, while the second receiver may receive UWB (e.g., OFDM) signals.

Further, the second receiver may generate a spectral energy measurement of a signal received from the first receiver. This measurement may be sent to an interference detection module that, based on the spectral energy measurement, detects the presence of any interference in a wireless signal received by the first receiver. Also, the spectral identification module may provide an indication of any identified interference to a radio associated with the first receiver.

The device may also include a controller that initiates such interference detection. Also, the second receiver may include one or more switches that are set by the controller. Each of these switches has a first setting for accepting a signal for demodulation, and a second setting for accepting a signal from the first receiver for interference detection.

The present invention advantageously provides for an entire available communications bandwidth to be checked for interference at once. Further features and advantages of the present invention will become apparent from the following description, claims, and accompanying drawings.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION OF THE PREFERRED EMBODIMENTS

I. Operational Environment

Figure 1:
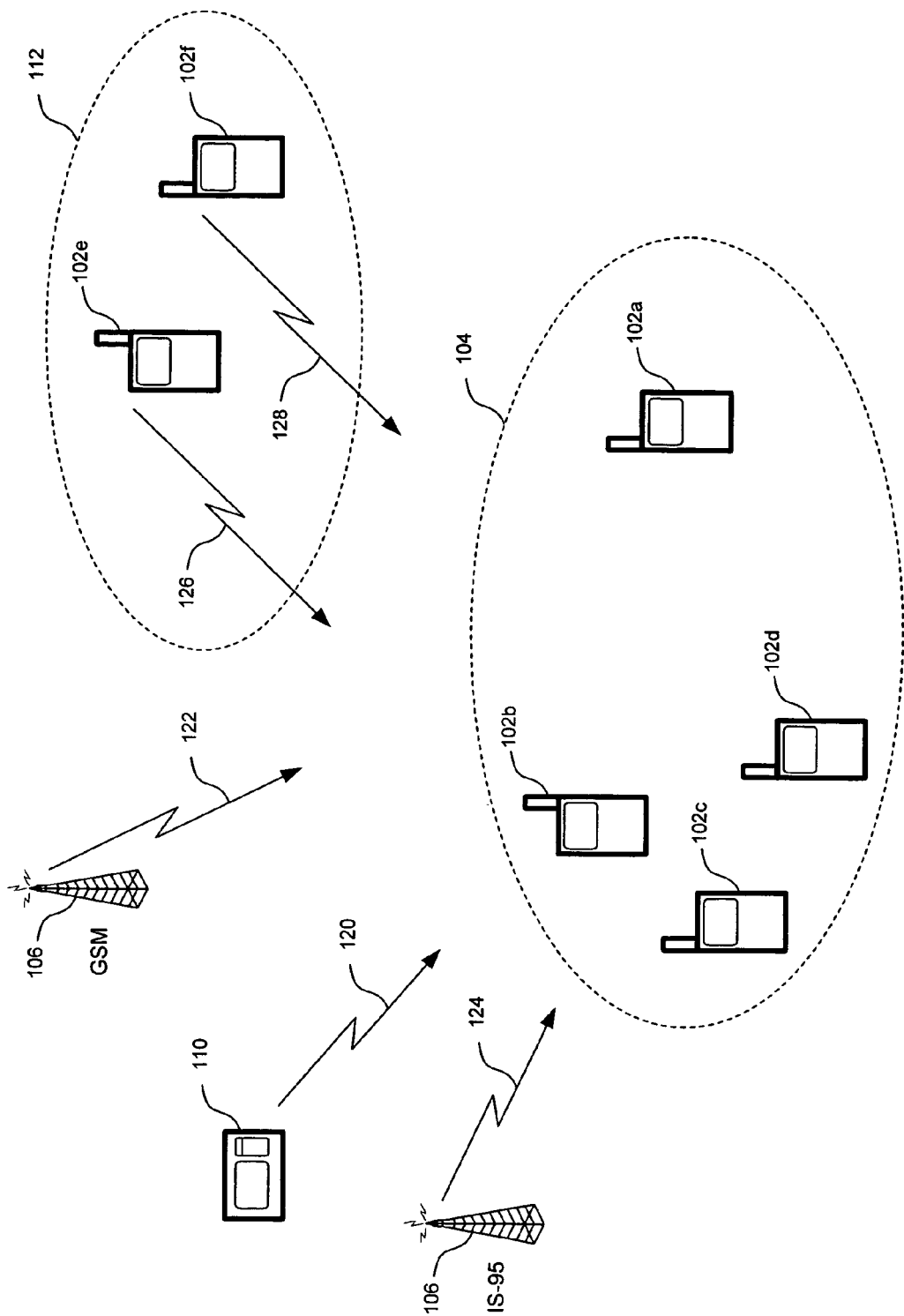
FIG. 1 is a diagram of an exemplary operational environment.

Before describing the invention in detail, it is helpful to first describe an environment in which the present invention may be employed. Accordingly, FIG. 1 is a diagram of an exemplary operational environment according to one embodiment of the present invention. In this environment, short-range wireless communications devices operate in the presence of multiple interfering signals.

In particular, FIG. 1 shows a plurality of wireless communications devices (WCD) 102*a-d* participating in a short-range wireless communications network 104. Short-range network 104 may be, for example, a Bluetooth network, an IEEE 802.11b/g network, or an IEEE 802.15.3a network.

Accordingly, devices 102 may generate transmissions within one or more portions of the RF spectrum, such as the ISM band. These transmissions may include Bluetooth signals, IEEE 802.11 signals, and IEEE 802.15.3a signals. As described above, IEEE 802.15.3a signals may include OFDM modulated UWB signals. The portion(s) of the RF spectrum available to short-range network 104 are referred to herein as the available communications bandwidth.

In the environment of FIG. 1, devices external to network 104 may also emit signals in the available communications bandwidth of short-range network 104. These devices may be non-communications related devices. For instance, FIG. 1 shows a microwave oven 110 generating emissions 120 that are within the available communications bandwidth of short-range network 104.

In addition to non-communications related devices, devices associated with other communications systems may emit signals within the available communications bandwidth of short-range network 104. Examples of such devices include cellular base stations and phones. For instance, FIG. 1 shows a GSM cellular base station 106 emitting harmonics 122 as well as an IS-95 cellular base station 108 emitting harmonics 124.

Moreover transmissions from other short-range networks, such as neighboring short-range network 112, may be within the available communications bandwidth of short-range network 104. As shown in FIG. 1, neighboring short-range network 112 includes WCDs 102e and 102f, which transmit signals 126 and 128. Like network 104, neighboring short-range network 112 may be, for example, a Bluetooth network, an IEEE 802.11b/g network, or an IEEE 802.15.3a network.

These transmissions may interfere with transmissions in short-range network 104. Accordingly, devices and neighboring networks, such as the ones of FIG. 1 are referred to herein as interference sources.

Interference sources may be static or dynamic. Static interference is more regular than dynamic interference. Accordingly, static interference is easier to detect. Bluetooth interference is fairly unpredictable, because it hops randomly over the ISM band. However, interference from IEEE 802.11b and IEEE 802.11g networks are more predictable (and thus more static) because transmissions from these networks include direct-sequence spread spectrum signals or OFDM signals that are contained within a channel that is approximately 22 MHz wide. Interference from microwave ovens is also fairly static because of their fairly constant spectral content.

The present invention provides improved techniques for identifying interference sources. Once identified, one or more devices in a wireless network, such as short-range wireless network 104, may transmit signals in a manner that avoids interference from these identified sources.

II. Wireless Communications Device

Figure 2A:
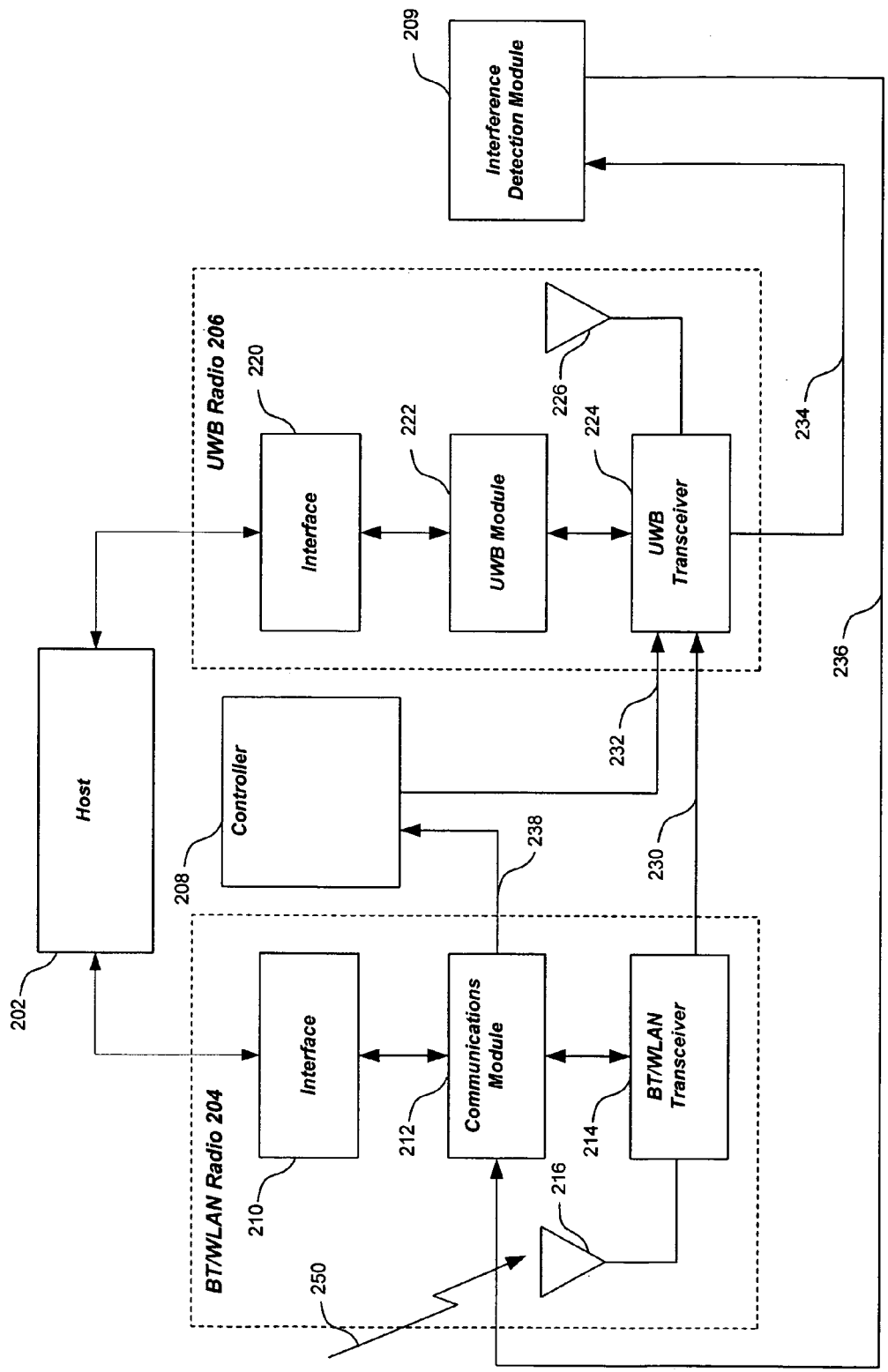
FIG. 2A is a diagram of an exemplary architecture for a wireless communications device.

FIG. 2A is a diagram showing a wireless communications device architecture according to aspects of the present invention. This architecture includes a host 202, a short-range wireless radio 204 (e.g., a Bluetooth and/or WLAN radio), a UWB radio 206, a controller 208, and an interference detection module 209. Radios 204 and 206 operate in collaboration for the detection of interference in a wireless communications bandwidth associated with the first receiver.

As shown in FIG. 2A, host 202 is coupled to radios 204 and 206. Host 202 is responsible for functions involving user applications and higher protocol layers, while radios 204 and 206 are responsible for lower layer protocols. More particularly, radio 204 is responsible for short-range communications (such as WLAN and/or Bluetooth communications) with other devices, and UWB radio 206 is responsible for higher data rate UWB specific communications with other devices.

Radio 204 includes an interface 210, a communications module 212, a transceiver 214, and an antenna 216. Communications module 212 performs functions related to link set-up, security and control. These functions may involve discovering corresponding remote devices and communicating with them according to a protocol, such as the Bluetooth link manager protocol (LMP). LMP defines a set of messages, which are also referred to as protocol data units (PDUs).

Communications module 212 exchanges information with host 202 across interface 210. This information may include commands received from host 202, and information transmitted by communications module 212 to host 202. In embodiments of the present invention, interface 210 defines a set of messages, which provide for this exchange of information.

In addition, communications module 212 operates as an intermediary between host 202 and transceiver 214. Accordingly, module 212 performs baseband processing for transmissions (e.g., Bluetooth and/or WLAN transmissions), such as error correction encoding and decoding. In addition, communications module 212 exchanges data with corresponding entities at remote devices according to physical layer protocols. Examples of such physical layer protocols include retransmission protocols such as the automatic repeat request (ARQ) protocol.

FIG. 2A shows that transceiver 214 is coupled to an antenna 216. Transceiver 214 includes electronics that allow (in conjunction with antenna 216) the device of FIG. 2A to exchange wireless signals (e.g., Bluetooth and/or WLAN signals) with remote devices. Such electronics include modulators, demodulators, amplifiers, and filters.

When the device of FIG. 2A engages in UWB communications, it employs the services of UWB radio 206. As shown in FIG. 2A, UWB radio 206 includes an interface 220, a UWB module 222, a UWB transceiver 224, and an antenna 226.

UWB module 222 provides for the exchange of information across UWB links according to one or more protocol layers. For example, UWB module 222 may provide session management functionality to manage various UWB sessions. In addition, UWB module 222 may perform baseband processing, such as error correction encoding and decoding. In addition, UWB module 222 may perform various link level protocols with remote devices according to various physical layer protocols. Examples of physical layer protocols include retransmission protocols such as the automatic repeat request (ARQ) protocol.

UWB module 222 exchanges information with host 202 across interface 220. This information may include commands received from host 202, and information transmitted by module 222 to host 202. In embodiments, interface 220 defines a set of messages, which provide for this exchange of information. In addition, UWB module 222 exchanges information with UWB transceiver 224 for communication across a wireless UWB link.

As shown in FIG. 2A, UWB transceiver 224 is coupled to antenna 226. UWB transceiver 224 includes electronics that (in conjunction with antenna 226) allow the device of FIG. 2A to exchange wireless UWB signals with devices, such as remote device 104. For the transmission of UWB signals, such electronics may include modulation components and/or a pulse generator for certain types of impulse UWB transmissions. For the reception of UWB signals, such electronics may include demodulation components, timing circuitry, and filters.

As described above, the device of FIG. 2A includes multiple radios. This feature may advantageously be used to detect interference. In embodiments, operations related to the detection of interference are distributed between the multiple radios, such as radios 204 and 206. Additional components, such as controller 208 and interference detection module 209 may also perform operations related to the detection of interference.

Controller initiate interference detection by radios 204 and 206. For instance, controller 208 directs UWB transceiver 224 of radio 206 to measure energy in a signal 230, which is generated by transceiver 214. Signal 230 is based on a wireless signal 250 that is received by radio 204. Controller 208 may direct UWB transceiver 224 in various ways. For example, FIG. 2A shows controller 208 sending a measurement command 232 to UWB transceiver 224 of radio 206.

Upon receipt of command 232, transceiver 224 measures the spectral characteristics of signal 230 (i.e., generates a spectral energy measurement). These characteristics are substantially similar to (or indicative of) the spectral characteristics of signal 250. These spectral characteristics are conveyed in a measurement signal 234, which is sent to interference detection module 209. Based on measurement signal 234, interference detection module 209 may detect the presence of interference in wireless signal 250.

Based on such detection, interference detection module 209 may send an interference indicator 236 to communications module 212 of radio 204. Indicator 236 identifies channel(s) which exhibit interference. Upon receipt of indicator 236, module 212 may coordinate wireless communications so that radio 204 avoids the use of such channels.

Figure 2B:
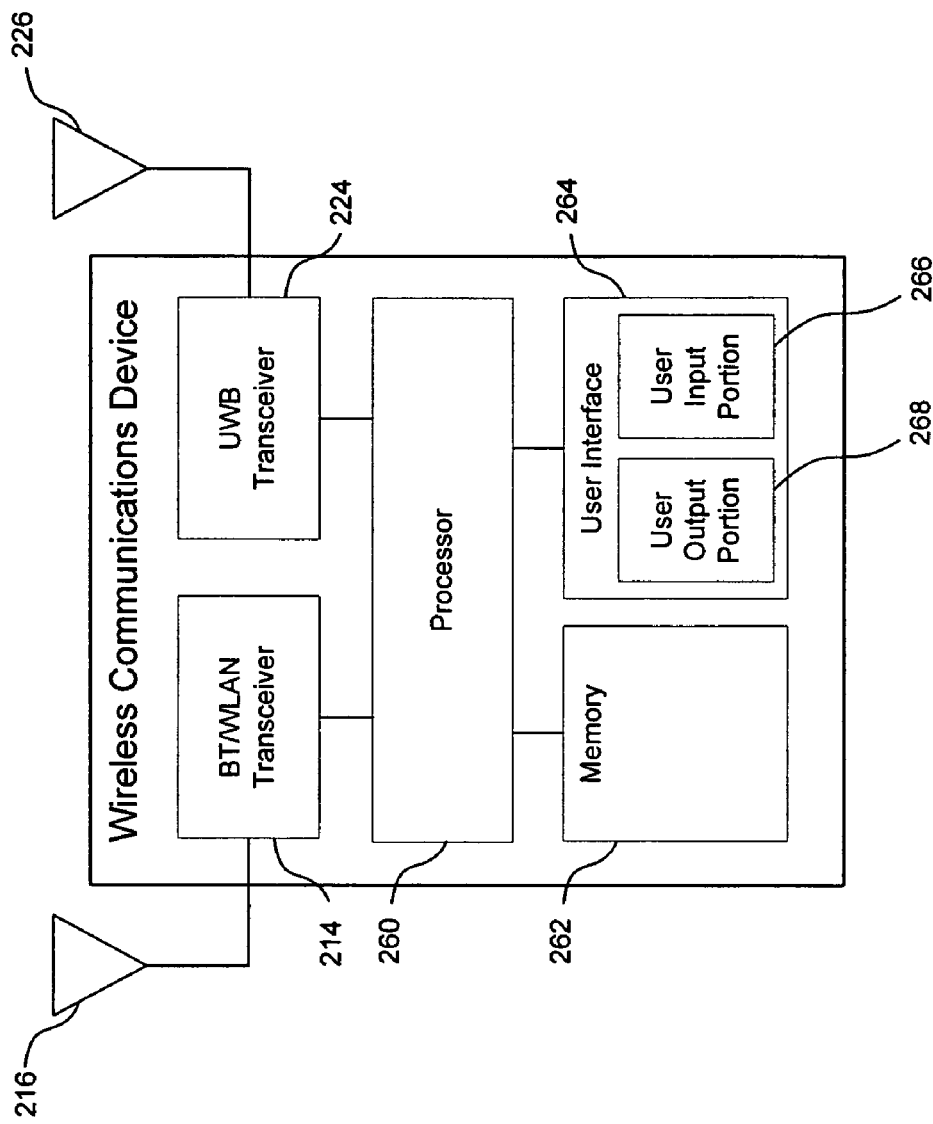
FIG. 2B is a diagram of an exemplary device implementation.

The architecture of FIG. 2A may be implemented in hardware, software, firmware, or any combination thereof. One such implementation is shown in FIG. 2B. This implementation includes a processor 260, a memory 262, and a user interface 264. In addition, the implementation of FIG. 2B includes transceiver 214, antenna 216, UWB transceiver 224, and antenna 226. Transceivers 214 and 224 may be implemented as described above with reference to FIG. 2A.

As shown in FIG. 2B, processor 260 is coupled to transceivers 214 and 224. Processor 260 controls device operation. Processor 260 may be implemented with one or more microprocessors that are each capable of executing software instructions stored in memory 262.

Memory 262 includes random access memory (RAM), read only memory (ROM), and/or flash memory, and stores information in the form of data and software components (also referred to herein as modules). These software components include instructions that can be executed by processor 260. Various types of software components may be stored in memory 262. For instance, memory 262 may store software components that control the operations of transceivers 214 and 224. Also, memory 262 may store software components that provide for the functionality of host 202, controller 208, interference detection module 209, interfaces 210 and 220, communications module 212, and UWB module 222.

In addition, memory 262 may store software components that control the exchange of information through user interface 264. As shown in FIG. 2B, user interface 264 is also coupled to processor 260. User interface 264 facilitates the device's interaction with a user. FIG. 2B shows that user interface 264 includes a user input portion 266 and a user output portion 268. User input portion 266 may include one or more devices that allow a user to input information. Examples of such devices include keypads, touch screens, and microphones. User output portion 268 allows a user to receive information from the wireless communications device. Thus, user output portion 268 may include various devices, such as a display, and one or more audio speakers. Exemplary displays include liquid crystal displays (LCDs), and video displays.

The elements shown in FIG. 2B may be coupled according to various techniques. One such technique involves coupling transceivers 214 and 224, processor 260, memory 262, and user interface 264 through one or more bus interfaces. In addition, each of these components is coupled to a power source, such as a rechargeable and/or removable battery pack (not shown).

III. Exemplary Receiver

Figure 3:
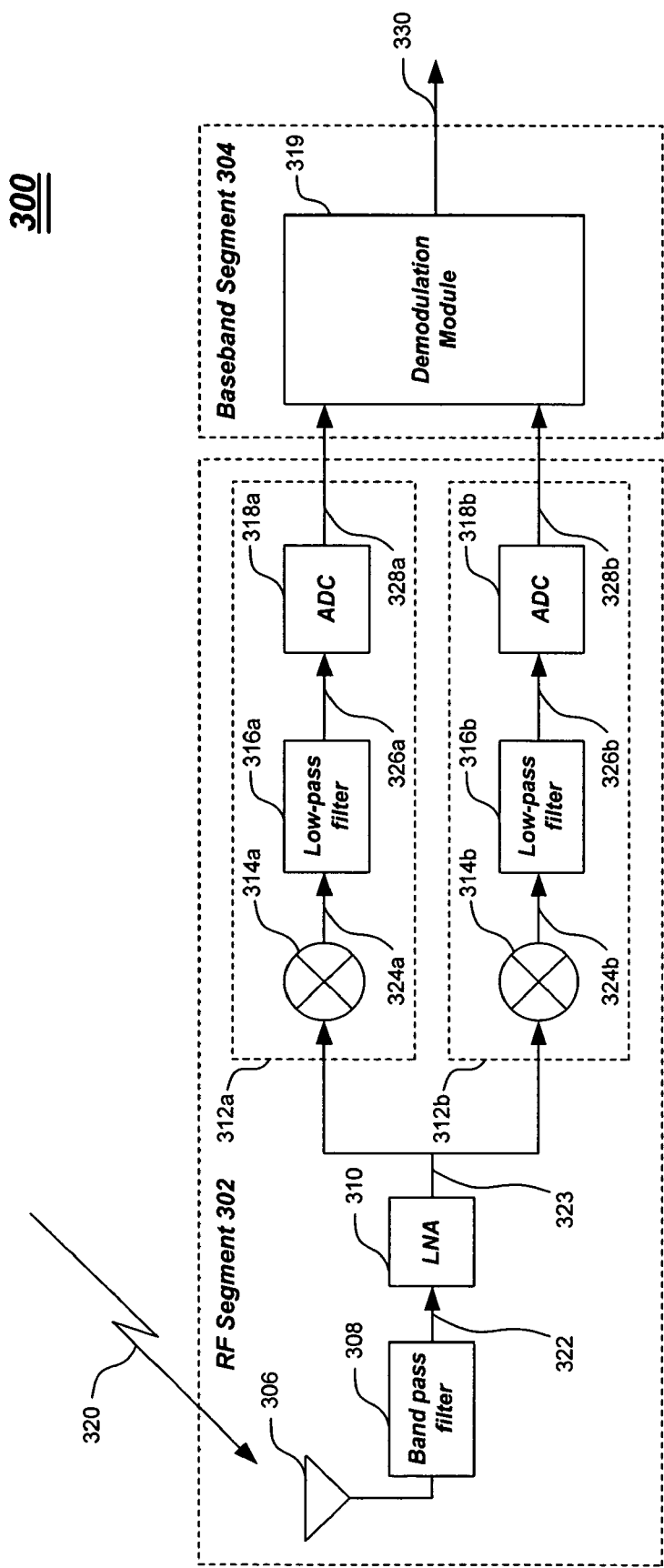
FIG. 3 is a block diagram of an exemplary receiver implementation.

As described above, the device architecture of FIG. 2A includes multiple radios, each having a transceiver. In embodiments, each of these transceivers has a distinct receiver. Accordingly, FIG. 3 is a block diagram of an exemplary receiver 300. This receiver may be used by transceiver 214 to receive, for example, IEEE 802.11 (i.e., WLAN) and/or Bluetooth signals.

Receiver 300 includes an RF segment 302 and a baseband segment 304. RF segment 302 includes an antenna 306, a band pass filter 308, and a low noise amplifier (LNA) 310. In addition, RF segment 302 includes an in-phase (I) processing path 312a and a quadrature (Q) processing path 312b.

As shown in FIG. 3, antenna 306 receives a wireless transmission 320 and passes it to band pass filter 308. In turn, band pass filter 308 produces from this transmission a filtered RF signal 322. Signal 322 is sent to LNA 310, which produces from it an amplified RF signal 323.

Amplified RF signal 323 is sent to processing paths 312 for downconversion. As shown in FIG. 3, each of processing paths 312 includes a mixer 314, a low pass filter 316, and an analog to digital converter (ADC) 318. Mixers 314 receive RF signal 323 from LNA 310.

Mixers 314 are each driven by a corresponding oscillator signal (not shown). These oscillator signals may be substantially sinusoidal and tuned to a frequency channel or band in which the reception of signals is desired. The oscillator signal driving mixer 314a and the oscillator signal driving mixer 314b are ninety degrees (90°) out of phase with each other.

As a result of such tuning, mixers 314 produce downconverted signals 324a and 324b. FIG. 3 shows that signals 324a and 324b are sent to low pass filters 316a and 316b, respectively. Low pass filters 316 (also referred to herein as channel filters) have a bandwidth, which corresponds to the tuned channel's frequency range. Accordingly, filters 316 remove from signals 324 energy that is outside of the tuned frequency channel. For Bluetooth implementations, an exemplary bandwidth is 1 MHz. For WLAN implementations, an exemplary bandwidth is 22 MHz. However, other bandwidths may be employed.

Filters 316 generate filtered signals 326, which are sent to ADCs 318. ADCs 318 convert filtered signals 326 (which are analog) into a digitally encoded representation. These representations are shown in FIG. 3 as an in-phase digital signal 328a and a quadrature digital signal 328b.

Baseband segment 304 includes a demodulation module 319. FIG. 3 shows that demodulation module 319 receives digital signals 328a and 328b and demodulates them according to a suitable modulation scheme, such as FSK. As a result of these operations, demodulation module 319 produces a data stream 330, which may be sent to higher layer entities (not shown). Examples of higher layer entities include media access controllers (MACs) and user applications.

IV. Interference

Figure 4:
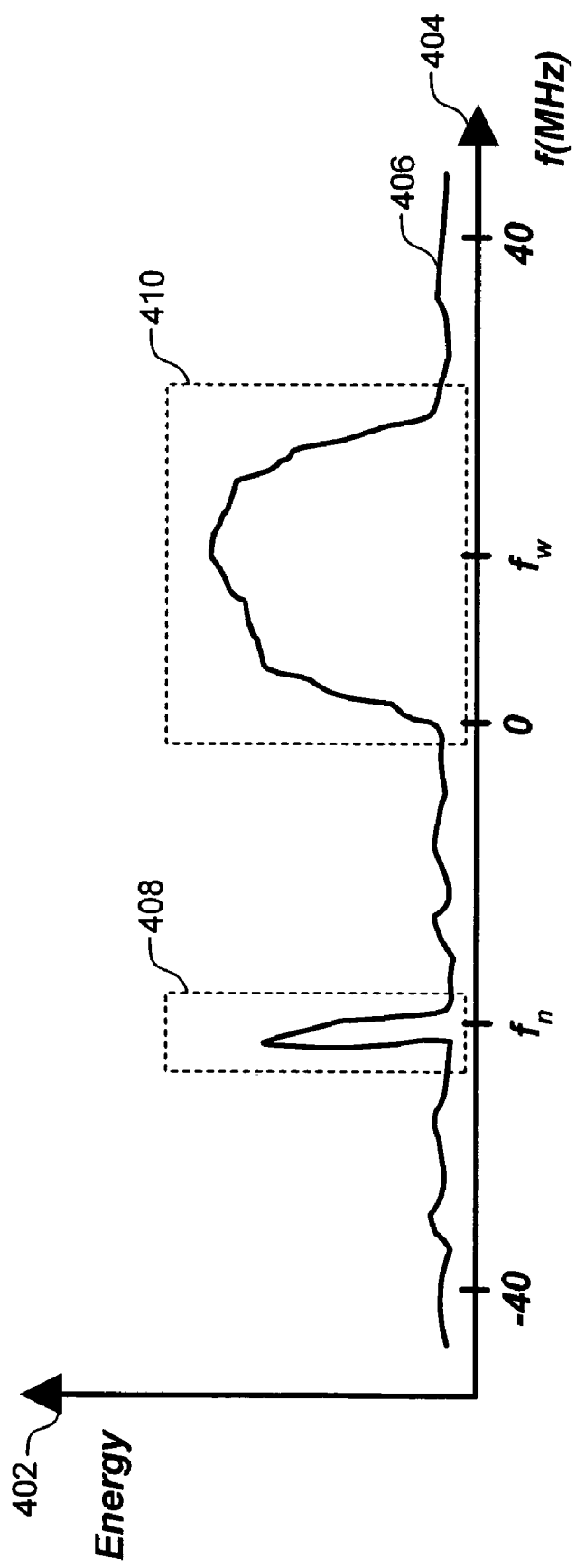
FIG. 4 a graph showing exemplary spectral characteristics.

FIG. 4 is a graph providing an illustrative example of spectral characteristics that may exist in downconverted signals, such as signals 324a and 324b. This graph plots signal energy as a function of frequency. As shown in FIG. 4, signal energy is plotted along an axis 402, while frequency is plotted in units of megahertz (MHz) along an axis 404.

The plotted signal energy is shown by a spectral envelope 406, which is a frequency level illustration of a downconverted signal when the corresponding mixer(s) are tuned to the middle of a particular band. Envelope 406 includes an example of narrow band interference, which occurs in a region 408. In addition, envelope 406 includes an example of wide band interference, which occurs in a region 410.

Certain forms of interference are tolerable, while others hinder communications. For example, the narrowband interference of FIG. 4 may be acceptable for short-range (e.g., Bluetooth and/or WLAN) communications, while the wideband interference of FIG. 4 may not be acceptable.

V. Receiver Arrangements

Figure 5A:
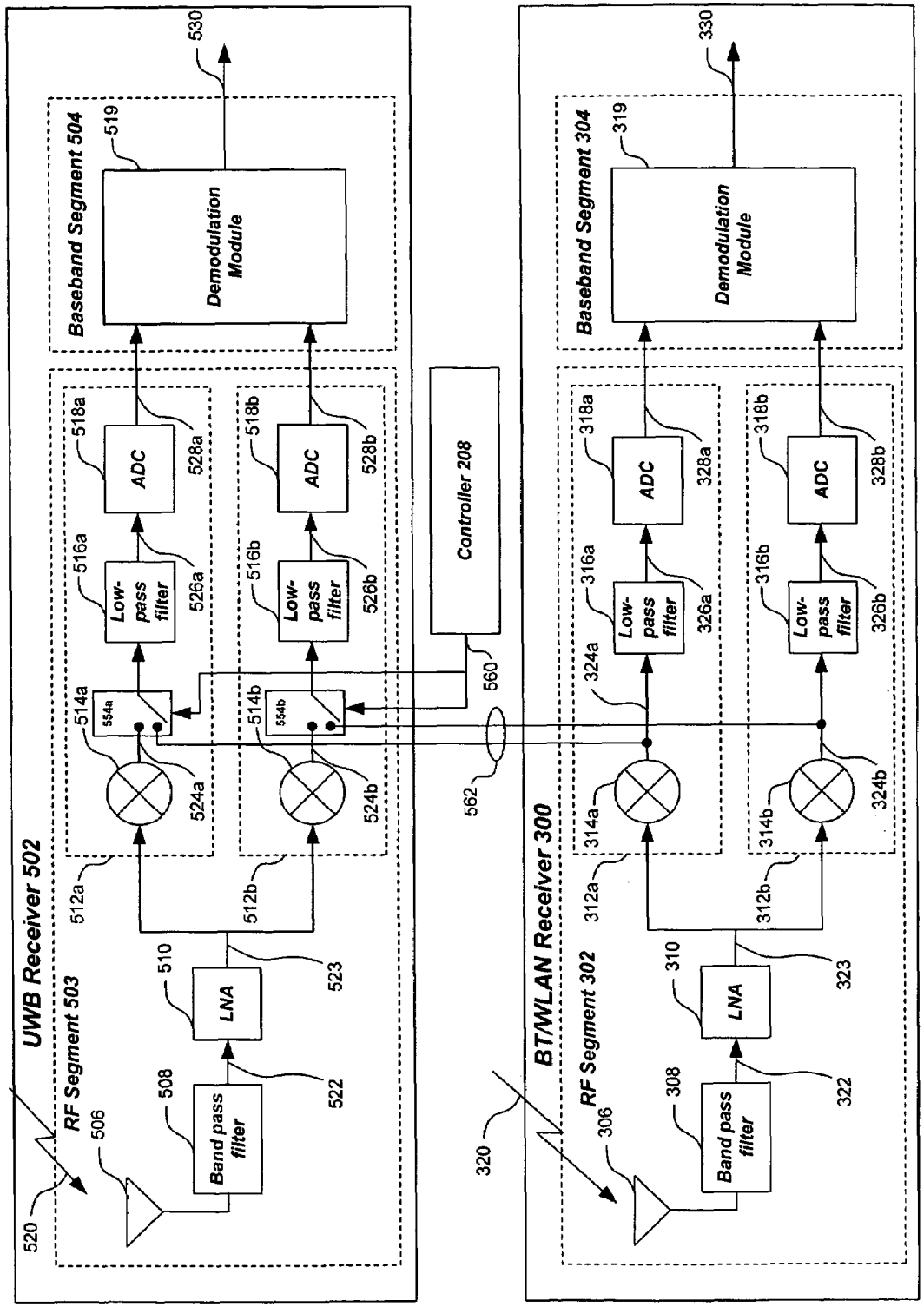
FIGS. 5A and 5B are block diagrams of exemplary receiver arrangements according to embodiments of the present invention.

FIG. 5A is a diagram showing an exemplary arrangement of receivers according to embodiments of the present invention. This arrangement includes receiver 300, a UWB receiver 502 (which may be employed in UWB transceiver 224), and controller 208.

UWB receiver 502 is similar in implementation to receiver 300. For instance, receiver 502 includes an RF segment 503 and a baseband segment 504. FIG. 5A shows that RF segment 503 includes an antenna 506, a band pass filter 508, an LNA 510, an in-phase (I) processing path 512a and a quadrature (Q) processing path 512b. Each of processing paths 512 includes a mixer 514, a low pass filter 516, and an ADC 518. Baseband segment 504 includes a demodulation module 519.

However, unlike receiver 300, the components of UWB receiver 502 are configured to receive UWB signals. For instance, demodulation module 519 is adapted to demodulate UVB (e.g., MBOA OFDM) signals. In addition, filters 508 and 516 have pass bands configured for the reception of UWB signals. Also, mixers 514 are capable of being tuned to frequencies that provide for the downconversion of UWB signals.

Moreover, receiver 502 includes switches 554a and 554b. As shown in FIG. 5A, these switches are controlled by a routing signal 560 that is generated by controller 208. The settings of switches 554a and 554b determine which signals are sent to low pass filters 516a and 516b. For instance, in a first setting, each of switches 554 directs a particular downconverted UWB signal 524 to a corresponding low pass filter 516. However, in a second setting, each of switches 554 directs a particular downconverted signal 324 from receiver 300 to a corresponding low pass filter 516. As shown in FIG. 5A, signals 324 are sent from receiver 300 to receiver 502 across a communications interface 562. Interface 562 may be implemented through various analog or digital techniques (e.g., data bus, signal lines, and/or DSP programming).

Figure 5B:
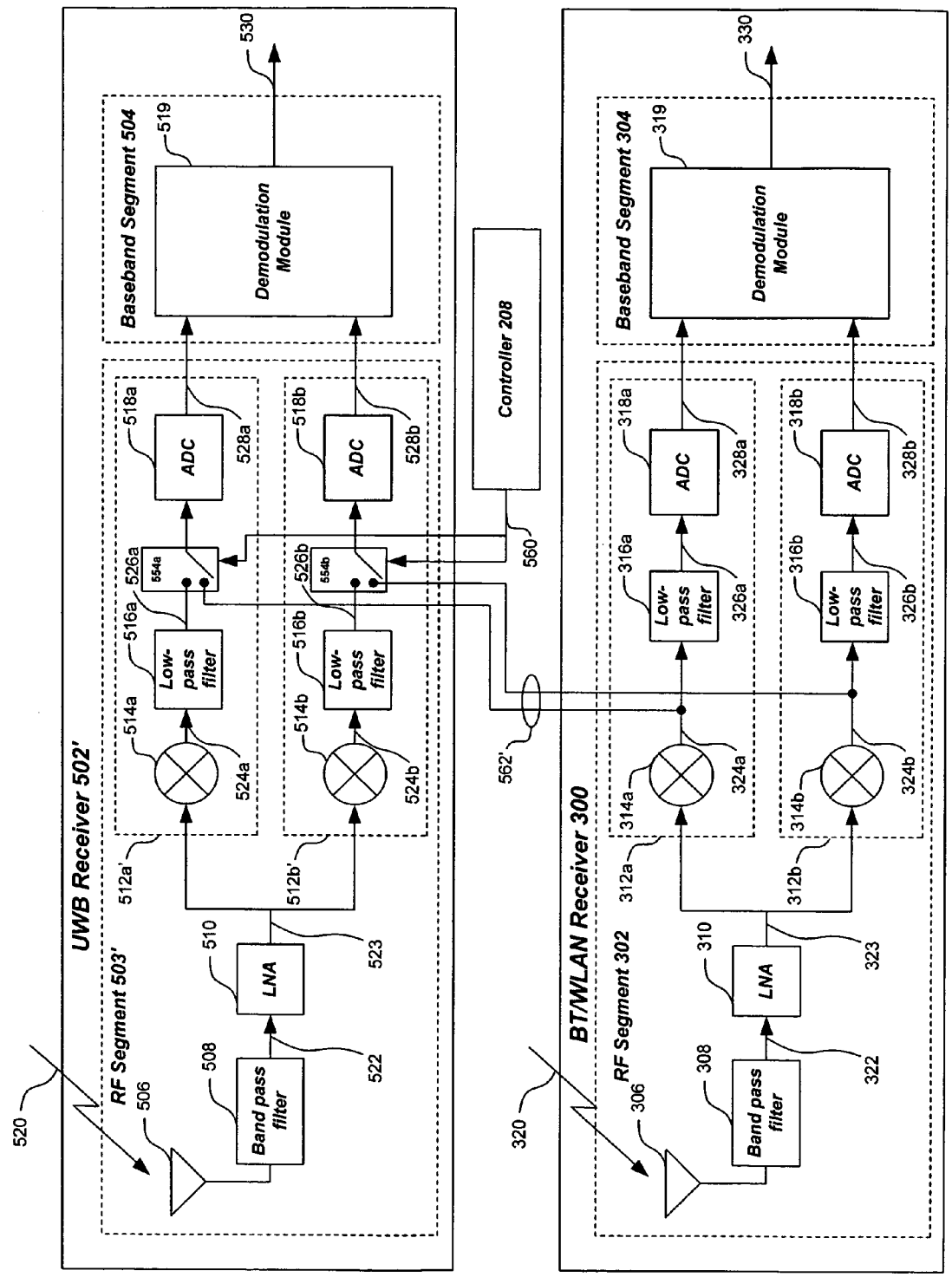

FIG. 5B is a diagram showing a further exemplary arrangement of receivers according to embodiments of the present invention. This arrangement is similar to the arrangement of FIG. 5A. However, the arrangement of FIG. 5B includes a UWB receiver 502'. UWB receiver 502' includes an RF segment 503' having processing portions 512a' and 512b'. In these processing portions, switches 554 have a different placement. In particular, each of switches 554 is placed between a corresponding low pass filter 516 and a corresponding ADC 518.

The settings of switches 554a and 554b determine which signals are sent to ADCs 518a and 518b. For instance, in its first setting, each of switches 554 directs a particular filtered signal 526 to a corresponding ADC 518. However, in its second setting, each of switches 554 directs a particular downconverted signal 324 from receiver 300 to a corresponding ADC 518. As in the arrangement of FIG. 5A, these switches in FIG. 5B are controlled by a routing signal 560 that is generated by controller 208. FIG. 5B shows that signals 324 are sent from receiver 300 to receiver 502' across a communications interface 562'. Interface 562' may be implemented according to techniques described above with reference to communications interface 562.

Figure 6:
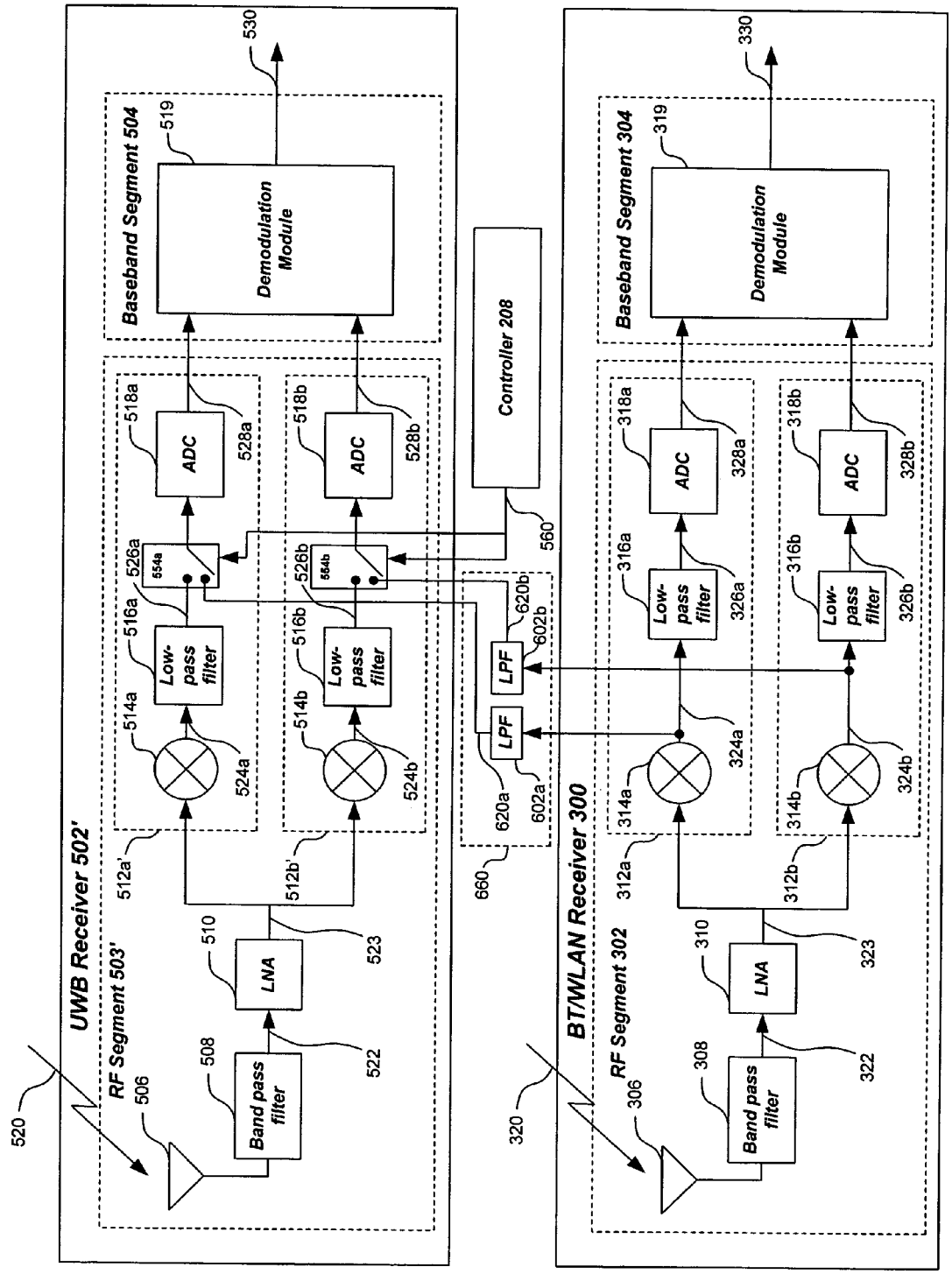
FIG. 6 is a block diagram of a further exemplary receiver arrangement according to an embodiment of the present invention.

By placing switches 554 before low-pass filters 516, the arrangement of FIG. 5A advantageously ensures that signals 526 are within a bandwidth that can be handled by ADCs 518. In contrast, the arrangement of FIG. 5B sends signals 324 to ADCs 518 without first being low pass filtered. Accordingly, in this arrangement, it may be desireable for to ensure that signals 324 are first within a band that is narrower than the bandwidths of ADCs 518. Accordingly, FIG. 6 provides an arrangement having extra filters. These extra filters may be used to ensure that the bandwidth of such signals are within the bandwidth of ADCs 518.

In particular, FIG. 6 shows a further arrangement of receivers according to embodiments of the present invention. This arrangement is similar to the arrangement of FIG. 5B. However, it includes low pass filters 602a and 602b. These filters receive downconverted signals 324a and 324b and produce filtered signals 620a and 620b. In turn, signals 620a and 620b are sent to switches 554a and 554b, respectively. As shown in FIG. 6, a communications interface 660 (which includes filters 602a and 602b) is used to provide this connectivity between receivers 300 and 502'. Interface 660 may be implemented through various analog or digital techniques (e.g., data bus, signal lines, electronic circuitry, and/or DSP programming).

Figure 7:
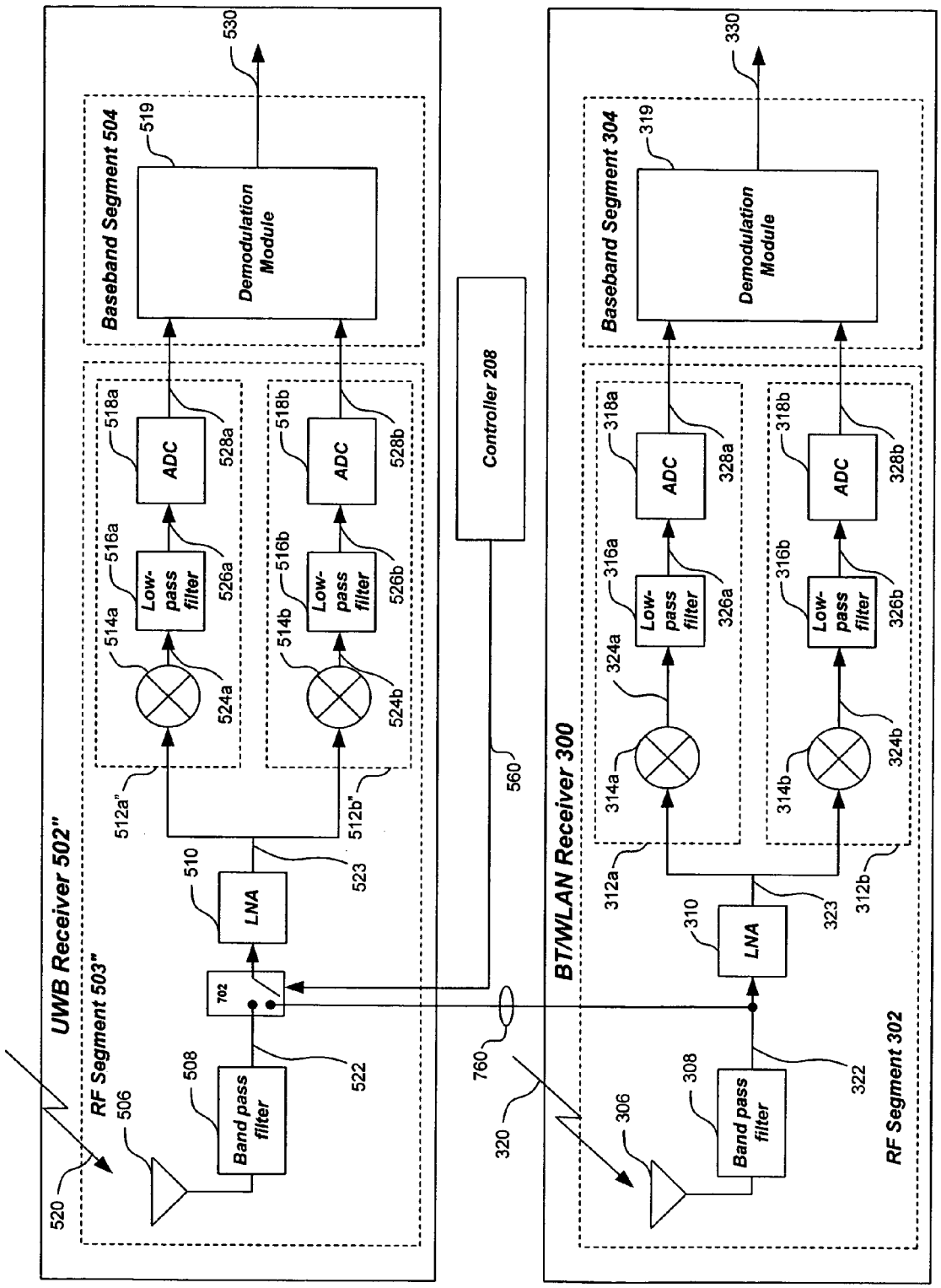
FIG. 7 is a block diagram of yet a further exemplary receiver arrangement according to an embodiment of the present invention.

FIG. 7 shows yet a further arrangement of receivers according to embodiments of the present invention. This arrangement includes receiver 300 and a UWB receiver 502". As shown in FIG. 7, receiver 502" is similar to receivers 502 and 502'. However, receiver 502" includes an RF segment 503" which includes a switch 702. In addition, receiver 502" includes processing paths 512a" and 512b". FIG. 7 shows that RF segment 503" receives RF signal 322 from receiver 300 at switch 702. Switch 702 also receives a filtered signal 522 from band pass filter 508. Signal 322 is transferred between receivers 300 and 502" across a communications interface 760, which may be implemented through barious techniques Interface 562 may be implemented through various analog or digital techniques (e.g., data bus, signal lines, and/or DSP programming).

The setting of switch 702 determines which signal is sent to LNA 510. For instance, in its first setting, switch 702 directs signal 522 to a corresponding LNA 510. However, in its second setting, switch 702 directs signal 322 from receiver 300 to LNA 510. As with switches 554, switch 702 is controlled by routing signal 560.

Referring to FIGS. 5A, 5B, 6, and 7, the reception of a wireless OFDM signal 520 by receivers 502, 502', and 502" is now described. These drawings show that antenna 506 receives OFDM signal 520 and sends it to band pass filter 508. In turn, band pass filter 502 generates filtered signal 522. In the arrangements of FIGS. 5A, 5B, and 6, signal 522 is amplified by LNA 510. In the arrqngement of FIG. 7, signal 522 is amplified by LNA 510 when switch 702 is in a position allowing for demodulation. This amplification produces an amplified signal 523.

In the arrangement of FIG. 5A, amplified signal 523 is sent to in-phase processing path 512a and quadrature processing path 512b. Similarly, in the arrangement of FIGS. 5B and 6, amplified signal 523 is sent to in-phase processing path 512a' and quadrature processing path 512b'. In the arrangement of FIG. 7, amplified signal 523 is sent to in-phase processing path 512a" and quadrature processing path 512b".

When switches 554a and 554b are each in a position allowing for demodulation (in the arrangements of FIGS. 5A, 5B, and 6), amplified signal 523 is processed into digitally encoded downconverted signals 528a and 528b. These signals are sent to demodulation module 519 for demodulation. In OFDM implementations, demodulation involves the calculation of a fast Fourier transform (FFT). In addition to demodulating OFDM signals, FFTs are useful for determining the spectral content of a signal.

As described above, the arrangements of FIGS. 5A, 5B, 6, and 7 include a switching feature provided by switches 554 or switch 702. This feature allows signals received from a first receiver (e.g., a WLAN or Bluetooth receiver) to obtain alternative processing by components in a second receiver (e.g., an MBOA OFDM receiver). This alternative processing may be used to determine the spectral characteristics of the signals received by the first receiver. For instance, this alternate processing may include a demodulation operation. More particularly, this alternative processing may include OFDM demodulation, which includes the computation of an FFT.

In embodiments of the present invention, demodulation by the first receiver and the alternative processing by the second receiver may be performed in parallel. However, in further embodiments, demodulation by the first receiver is bypassed when such alternate processing is performed.

VI. Interference Detection

As described above, embodiments of the present invention employ receivers that are capable of demodulating OFDM signals. These receivers may also be used to determine the spectral characteristics of a signal received by a different receiver, such as a Bluetooth or WLAN receiver.

OFDM signals include one or more symbols. Each OFDM symbol is created from unmodulated information by subjecting the information to an inverse fast Fourier transform (IFFT). The unmodulated information may include payload data associated with applications and header information. Such header information may be associated with the physical layer, as well as other protocol layers (e.g., the MAC layer). In addition, the unmodulated information may include channel estimation sequences that will be used by receiving devices to determine channel properties associated with the communications link.

After the IFFT is computed, additional processing may be performed to create an OFDM signal. For instance, the result of the IFFT may be appended with one or more values (e.g., zero padding). These OFDM symbols may be prepared for wireless transmission by upconverting them to a carrier frequency and amplifying them. However, other techniques may be employed. For instance, more than one carrier frequency may be used to transmit OFDM symbols according to a frequency hopping scheme.

VII. Fast Fourier Transform

The fast Fourier transform (FFT) is a discrete Fourier transform algorithm in which the number of required computations is reduced to provide for efficient processing. Certain WLAN receivers (e.g., IEEE 802.11g receivers) offer FFT capabilities. However, these FFT capabilities are not desirable for measuring spectral characteristics in an available communications bandwidth. For example, due mainly to its low sampling rate, a typical WLAN receiver having such capabilities provides a 2.4 GHz FFT that can measure only a 22 MHz channel.

In contrast, UWB systems can offer wider channel measurement capabilities because of their very high sampling rate. For instance, an MBOA OFDM FFT provides a greater number of points. Also, the ADCs of an MBOA OFDM receiver (e.g., ADCs 518) operate at a higher sampling rate. Such features allow for a greater frequency resolution to be obtained. Accordingly, receivers, such as MBOA OFDM receivers, offer a wide enough frequency resolution so that an entire band for short range wireless systems (e.g., WLAN and Bluetooth networks) can be measured at once.

VIII. Interference Detection Module

Figure 8:
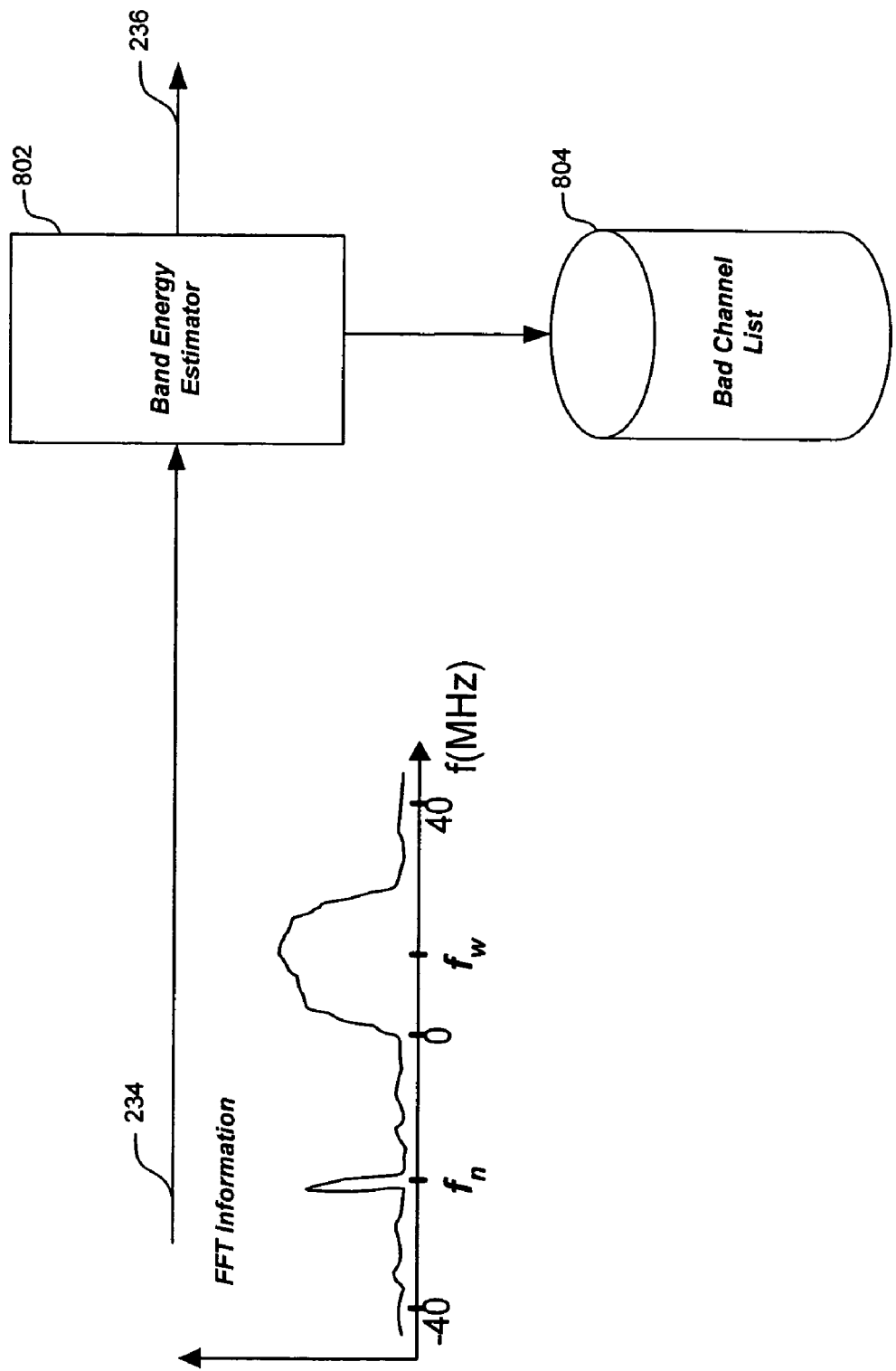
FIG. 8 is a diagram of an exemplary interference detection module implementation.

As described above with reference to FIG. 4, some forms of interference are acceptable, while others are not. In embodiments, interference detection module 209 identifies interference that is not acceptable. FIG. 8 is a diagram showing an exemplary implementation of interference detection module 209. This implementation includes a band energy estimator 802 and a bad channel list 804. As described above, these components may be implemented in hardware, firmware, software, or any combination thereof.

As shown in FIG. 8, band energy estimator 802 receives measurement signal 234. As described above with reference to FIG. 2, this signal conveys the spectral characteristics of a signal provided by a receiver of radio 204. In embodiments, signal 234 includes the results of an FFT. As described above with reference to FIGS. 5A, 5B, and 6, this FFT may be performed by an OFDM demodulator.

Upon receipt of signal 234, band energy estimator 802 identifies interference in the communications band that can hinder communications for radio 204. In embodiments, this band is wider than an individual channel employed by radio 204. In fact, this band may wider than the available communications bandwidth of radio 204. Accordingly, the present invention allows for interference of an available communications bandwidth to be identified at once.

The identification of interference by band energy estimator 802 may involve numerical analysis, such as summation and/or differential processing. Spectral energy that satisfies certain characteristics, such as minimum bandwidth and energy parameters, is identified as interference. Once such energy is identified, band energy estimator 802 maps this interference to channel identifiers employed by radio 204. This mapping can be implemented with a lookup table stored, for example, in memory 262. As shown in FIG. 8, these channel identifiers are stored in a bad channel list 804. Bad channel list 804 may be stored, for example, in memory 262.

Based on the identification of interference, band energy estimator 802 generates interference indicator 236, which is sent to radio 204. As described above, indicator 236 identifies channel(s) that exhibit interference. Accordingly, in embodiments, indicator 236 communicates bad channel list 804 to radio 204.

Figure 9:
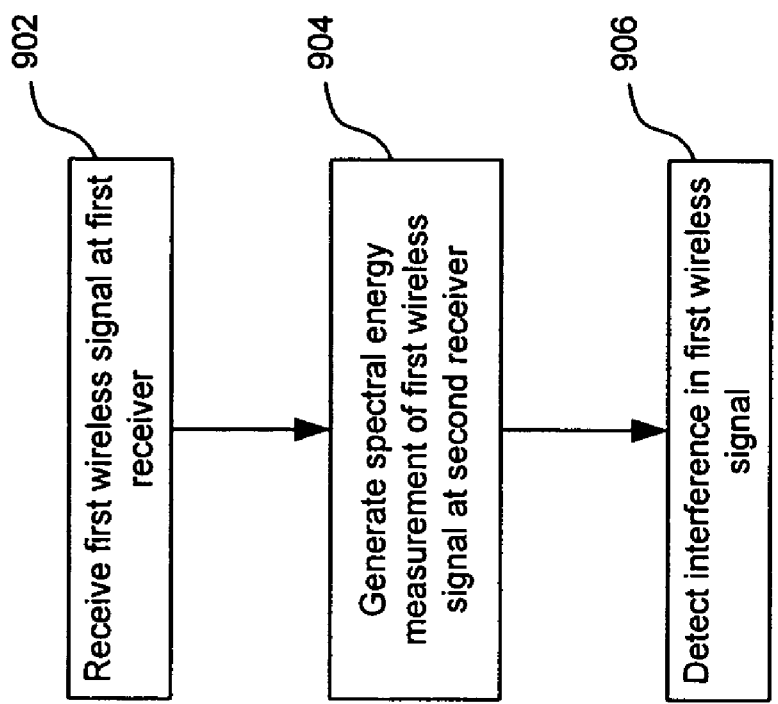
FIG. 9 is a flowchart of an operational sequence.

FIG. 9 is a flowchart illustrating a method according to an embodiment of the present invention. This method may be performed by the various implementations and arrangements described above. Moreover, this method may be performed by other implementations and arrangements.

As shown in FIG. 9, this method includes a step 902. In this step, a first wireless signal is received at a first receiver. The first receiver may be within a first radio, such as radio 204. Accordingly, this receiver may be implemented in the manner of receiver 300.

In a step 904, a spectral energy measurement of the first wireless signal is generated at a second receiver. The second receiver may be within a second radio, such as radio 206. Accordingly, it may be implemented in the manner of receivers 502 and 502'.

A step 906 follows step 904. In this step, interference is detected in the first wireless signal based on the spectral energy measurement generated in step 904.

IX. Conclusion

While various embodiments of the present invention have been described above, it should be understood that they have been presented by way of example only, and not in limitation. For instance, although examples have been described involving Bluetooth, IEEE 802.11, and IEEE 802.15.3a technologies, other short-range and longer range communications technologies are within the scope of the present invention.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A wireless communications device, comprising:
a narrowband receiver configured to receive a first wireless signal;
a wideband receiver configured to receive a second wireless signal, the wideband receiver coupled to the narrow band receiver via a communications interface and further configured to determine spectral characteristics of the first wireless signal received over the communications interface from the narrowband receiver; and
an interference detection module coupled to the wideband receiver configured to identify interference in the narrowband receiver based on the determined spectral characteristics and provide an interference indicator of interfering channels to the narrowband receiver to enable the narrowband receiver to avoid use of the interfering channels.

2. The wireless communications device of claim 1, further comprising:
a controller configured to direct the wideband receiver to determine the spectral characteristics of the first wireless signal.

3. The wireless communications device of claim 2, wherein the controller is further configured to pass one or more baseband signals from the narrowband receiver to the wideband receiver, wherein the one or more baseband signals are derived from the first wireless signal.

4. The wireless communications device of claim 3, wherein the one or more baseband signals include an in-phase (I) signal and a quadrature (Q) signal.

5. The wireless communications device of claim 3, wherein the wideband receiver includes a fast Fourier transform (FFT) module, the FFT module configured to demodulate the second signal and to determine the spectral characteristics of the first wireless signal.

6. The wireless communications device of claim 1, wherein the first signal is a Bluetooth signal.

7. The wireless communications device of claim 1, wherein the first signal is a wireless local area network (WLAN) signal.

8. The wireless communications device of claim 1, wherein the second signal is an ultra wideband (UWB) signal.

9. The wireless communications device of claim 8, wherein the UWB signal is an orthogonal frequency division multiplexed (OFDM) signal.

10. The wireless communications device of claim 1, wherein the narrowband receiver is coupled to the wideband receiver.

11. The wireless communications device of claim 1, wherein the narrowband receiver is included in a Bluetooth radio.

12. The wireless communications device of claim 1, wherein the narrowband receiver is included in a wireless local area network (WLAN) radio.

13. The wireless communications device of claim 1, wherein the wideband receiver is included in an ultra wideband (UWB) radio.

14. The wireless communications device of claim 1, further comprising:
the wideband receiver connected to the interference detection module to provide the spectral characteristics of the first wireless signal to the interference detection module; and
the interference detection module connected to the narrowband receiver to provide an interference indication to the narrowband receiver in response to said spectral characteristics.

15. A method, comprising: (a) receiving a first wireless signal at a narrowband receiver; (b) receiving a second wireless signal at a wideband receiver; (c) receiving the first wireless signal at the wideband receiver from the narrowband receiver via the communications interface coupled therebetween; (d) generating a spectral energy measurement of the first wireless signal received from the narrowband receiver via the communications interface at the wideband receiver; and (e) based on the spectral energy measurement by the wideband receiver, detecting interference in the narrowband receiver and providing an interference indicator of interfering channels to the narrowband receiver to enable the narrowband receiver to avoid use of the interfering channels.

16. The method of claim 15, wherein step (b) comprises calculating a fast Fourier transform (FFT) on one or more baseband signals based on the first wireless signal.

17. The method of claim 16, wherein the one or more baseband signals include an in-phase (I) signal and a quadrature (Q) signal.

18. The method of claim 15, wherein the first signal is a Bluetooth signal.

19. The method of claim 15, wherein the first signal is a wireless local area network (WLAN) signal.

20. The method of claim 15, wherein the second signal is a ultra wideband (UWB) signal.

21. The method of claim 20, wherein the UWB signal is an orthogonal frequency division multiplexed (OFDM) signal.

22. The method of claim 15, wherein step (c) comprises identifying one or more frequency channels having interference, the one or more frequency channels available for reception by the narrowband receiver.

23. The method of claim 22, further comprising avoiding use of the one or more identified frequency channels by the narrowband receiver.

24. A wireless communications device, comprising: a narrowband receiver configured to receive a first wireless signal; and a wideband receiver configured to receive a second wireless signal, the wideband receiver coupled to the narrowband receiver via a communications interface to receive the first wireless signal from the narrowband receiver, the wideband receiver further configured to determine spectral characteristics of the first wireless signal received from the narrowband receiver via the communications interface; the narrowband and wideband receivers are configured to operate in collaboration for the detection of interference in the narrowband receiver based on the determined spectral characteristics and provision of an interference indicator of interfering channels to the narrowband receiver to enable the narrowband receiver to avoid use of the interfering channels.

25. The wireless communications device of claim 24, further comprising:
a controller configured to initiate interference detection by the narrowband and wideband receivers.

26. The wireless communications device of claim 25, wherein the wideband receiver includes one or more switches, each switch having a first setting for accepting a signal for demodulation, and a second setting for accepting a signal from the narrowband receiver for interference detection; wherein the controller is configured to set each of the one or more switches.

27. The wireless communications device of claim 24, wherein the wideband receiver is configured to generate a spectral energy measurement of a signal received from the narrowband receiver.

28. The wireless communications device of claim 27, wherein the wideband receiver includes a fast Fourier transform (FFT) module, wherein the FFT module generates the spectral energy measurement.

29. The wireless communications device of claim 27, further comprising an interference detection module configured to:
receive the spectral energy measurement from the wideband receiver;
based on the spectral energy measurement, detect the presence of any interference in a wireless signal received by the first receiver; and
provide an indication of any identified interference to a radio associated with the narrowband receiver.

30. The wireless communications device of claim 24, wherein the wideband receiver is configured to receive ultra wideband (UWB) signals.

31. The wireless communications device of claim 30, wherein the UWB signals are orthogonal frequency division multiplexed (OFDM) signals.

32. The wireless communications device of claim 24, wherein the narrowband receiver is configured to receive Bluetooth signals.

33. The wireless communications device of claim 24, wherein the narrowband receiver is configured to receive wireless local area network (WLAN) signals.

34. A wireless communications device, comprising:
a narrowband receiver configured to receive a first wireless signal;
a wideband receiver configured to receive a second wireless signal, the wideband receiver further configured to determine spectral characteristics of the first wireless signal from one or more additional signals, the one or more additional signals derived from the first wireless signal;
a communications interface coupling the narrowband receiver to the wideband receiver, the communications interface configured to send the one or more additional signals from the narrowband receiver to the wideband receiver; and
an interference detection module configured to identify interference in the narrowband receiver based on the determined spectral characteristics by the wideband receiver and provide an interference indicator of interfering channels to the narrowband receiver to enable the narrowband receiver to avoid use of the interfering channels.

35. The wireless communications device of claim 34, wherein the wideband receiver includes one or more switches, each switch having a first setting for accepting a signal based on the second signal for demodulation, and a second setting for accepting one of the additional signals for interference detection.

36. The wireless communications device of claim 35, further comprising a controller configured to set each of the one or more switches.

37. A method, comprising:
configuring a narrowband receiver to receive a first wireless signal;
configuring a wideband receiver to receive a second wireless signal,
configuring a controller to direct the wideband receiver to determine the spectral characteristics of the first wireless signal, wherein the controller is further configured to pass one or more baseband signals from the narrowband receiver to the wideband receiver via a communications interface coupled therebetween, wherein the one or more baseband signals are derived from the first wireless signal, and wherein the one or more baseband signals include an in-phase (I) signal and a quadrature (Q) signal;
configuring a fast Fourier transform (FFT) module in the wideband receiver to demodulate the second signal to determine the spectral characteristics of the first wireless signal; and
configuring an interference detection module to identify interference in the narrowband receiver based on the determined spectral characteristics by the wideband receiver and provide an interference indicator of interfering channels to the narrowband receiver to enable the narrowband receiver to avoid use of the interfering channels.

* * * * *

UNITED STATES PATENT AND TRADEMARK OFFICE
CERTIFICATE OF CORRECTION

PATENT NO. : 7,643,811 B2
APPLICATION NO. : 10/853212
DATED : January 5, 2010
INVENTOR(S) : Reunamäki et al.

It is certified that error appears in the above-identified patent and that said Letters Patent is hereby corrected as shown below:

<u>In Column 14</u>

Line 19 (claim 16), "wherein step (b)" should read, --wherein step (d)--;

Line 34 (claim 22), "wherein step (c)" should read, --wherein step (e)--.

Signed and Sealed this

Twenty-ninth Day of June, 2010

David J. Kappos
*Director of the United States Patent and Trademark Office*